United States Patent [19]

Gavaras et al.

[11] Patent Number: 5,048,081
[45] Date of Patent: Sep. 10, 1991

[54] ARRANGEMENT FOR ROUTING PACKETIZED MESSAGES

[75] Inventors: George W. Gavaras, West Long Branch, N.J.; Albert S. Loots, Naperville, Ill.; Praful B. Shanghavi, Edison, N.J.

[73] Assignee: AT&T Bell Laboratories, Murray Hill, N.J.

[21] Appl. No.: 458,070

[22] Filed: Dec. 28, 1989

[51] Int. Cl.[5] .................. H04M 7/06; H04Q 3/78; H04Q 11/04

[52] U.S. Cl. ................... 379/221; 370/60.1; 379/14; 379/230

[58] Field of Search ............ 379/221, 207, 230, 229, 379/10, 14, , 220, 224; 370/60.1, 60, 61

[56] References Cited

U.S. PATENT DOCUMENTS

| | | | |
|---|---|---|---|
| 4,611,096 | 9/1986 | Asmuth et al. | 379/207 |
| 4,723,272 | 2/1988 | Maat | 379/211 |
| 4,754,479 | 6/1988 | Bicknell et al. | 379/207 |
| 4,811,334 | 3/1989 | Maat | 370/60 |
| 4,811,388 | 3/1989 | Westerhof et al. | 379/229 |
| 4,943,999 | 7/1990 | Ardon | 379/221 |

Primary Examiner—Thomas W. Brown
Attorney, Agent, or Firm—P. Visserman; W. Ulrich

[57] ABSTRACT

In a telecommunication system having a plurality of cooperating exchanges and using a separate signaling network, an existing exchange is replaced by a new exchange by a piecemeal transferring of interexchange trunks from the existing exchange to the new exchange and testing the trunks on the new exchange. All signaling messages pertaining to trunks originally resident on the existing exchange are addressed to the existing exchange, are intercepted and are selectively forwarded to the new exchange on the basis of recorded data defining trunks moved to the new exchange. One embodiment uses a point code converter connected between a signal transfer access point for the signaling network and both the old and the new exchange. The converter receives all messages addressed to the existing exchange and transfers the messages to either the old or the new exchange, depending on the present location of the trunk. Messsages transmitted from the new exchange to other exchanges of the network are modified by inserting the identity of the old exchange as the source of the message. Another embodiment assigns a pseudo point code (address) to the new exchange and messages addressed to the existing exchange and pertaining to trunk circuits on the new exchange, are modified to include the pseudo point code and are transmitted via the signal transfer point to the new exchange. Messages from the new exchange destined for other exchanges of the network are relayed via the old exchange to the ultimate destination of the message.

25 Claims, 11 Drawing Sheets

ARRANGEMENT FOR ROUTING PACKETIZED MESSAGES

FIELD OF THE INVENTION

The invention relates to the routing and delivery of packetized messages between transmitting and receiving nodes and relates in particular to method and apparatus for handling packetized messages during node modification or replacement.

BACKGROUND OF THE INVENTION

One type of network comprising a plurality of packet transmitting and receiving nodes is a telecommunicating signaling network interconnecting telecommunication exchanges, known as the Signaling System 7 (SS7) as defined by the International Telegraph and Telephone Consultative Committee (CCITT) or the American National Standard Institute (ANSI) standards body. In such a system, information relating to the connection of telephone calls is communicated between exchanges via the SS7 network in a packet format. From time to time it is necessary to replace an exchange which is technologically obsolescent with an exchange that embodies the state of the art in telecommunications switching products to offer more features, carry more traffic, and support state of the art telecommunications services. Typically this is done by replacing the entire switching system of the exchange together with its interface connections to subscriber lines and trunk circuits connecting the exchange to the remainder of the telecommunications network. Such replacement must be done without significantly interrupting telephone service normally provided by the exchange. This is a well known problem in the art. In prior art systems using in-band signalling, wherein the signaling information related to telephone calls is transmitted over the same interexchange trunks as the calls themselves, the problem is solved by performing a flash cut transfer of all lines and trunks, from the existing exchange to the new exchange. One problem associated with this approach is that the new exchange is expected to handle all telephone traffic immediately after the flash cut. A flash cut may have to be made back to the old system if substantial errors are present in the new system. Catastrophic failures are more likely to occur when live telecommunications traffic is transferred from one system to another. With the SS7 out of band signaling arrangement, the procedure is even more complex since such a flash cut also requires the simultaneous interchange of connections of the old and the new exchanges in the signaling network. Signaling messages are transferred between exchanges on the basis of assigned addresses. One prior art approach to the aforementioned problem is to establish the new exchange as a separate node with its own unique node address identification, connecting a new set of telecommunication transmission trunks from the new switching system to the remainder of the network, performing tests on the trunks prior to cutover, and doing a flash cut of the signaling links simultaneously with the cutover of the trunks. That approach, however, requires that all of the exchanges which communicate with the exchange change their packet addressing from the address of the old exchange to that of the new, at the instant of the flash cut.

These prior art approaches to the replacement of a node, or the inner workings of a node, in a multi-node system operating in real time which relies on packetized messages for operational control, have serious drawbacks. A standard flash cut procedure without precut over testing of connections is subject to high failure rates. The prior art approach of installing all new interconnecting trunks is expensive and the assignment of a separate packet address requires cumbersome changes in all other nodes of the packet network.

SUMMARY OF THE INVENTION

These and other problems of the prior art are overcome in accordance with this invention in a multi-node system using packetized communications, by transferring certain functions from an existing node to a new node, storing data defining the transferred functions, intercepting incoming packetizing messages addressed to the existing node, and selectively applying incoming messages to a new node. The selection is on the basis of function related information in the intercepted message and the stored data. In one embodiment of the invention, the nodes are telecommunication exchanges interconnected by inter exchange trunks and a packet signaling network. The interexchange trunks and their associated telecommunications functions may be transferred in small groups from an existing exchange to a new exchange and a record is made in a data base of the identity of the transferred entities. An incoming message addressed to the existing exchange is intercepted and transferred to the new exchange if the interexchange trunk to which the message relates has been transferred to the new exchange. The message is applied to the existing exchange in the event that the pertinent trunk has not been transferred. Advantageously, this arrangement allows trunks to be moved to the new exchange on a piecemeal basis and individually tested prior to cutover from the existing exchange to the new exchange. Furthermore, this arrangement also allows growth expansion on the new exchange during the change over phase by the addition to the new exchange of trunks not initially connected to the existing old exchange. This may be accomplished by identifying the new trunks in the old exchange or by causing the old exchange to forward to the new exchange all recognized messages pertaining to trunks not assigned to the old exchange.

In accordance with one embodiment, a pseudo address code is assigned to the new exchange. A network access control unit for the signaling network is modified to allow the use of the pseudo address code and intercepted packets relating to trunks assigned to the new exchange are transmitted to the new exchange using the pseudo code. Advantageously, other nodes of the system do not have to be modified since the pseudo code is used only on a temporary basis and the real address of the old exchange is assigned to the new exchange at the time of cutover. This arrangement allows for a controlled cutover and hence a much lower probability of catastrophic errors during the cutover phase and further reduces the necessity for coordinated cutover action at a larger number of exchanges, as is required in a prior art approach.

In accordance with one embodiment of the invention, an interface unit is interposed between the signaling network and both the old and new exchange. The interface unit includes a data base which may be updated periodically and which defines the equipment transferred from the old exchange to the new. When a signaling message identifying the old switch is received at the interface unit, the data base is constituted to determine whether the pertinent equipment is assigned to the old or the new switch and the message information is modified if necessary, and is transmitted to the corresponding exchange. In this embodiment, subscriber line circuits and trunk circuits may be selectively transferred from the old to the new exchange and handle full scale telecommunications traffic. A data base records data identifying both lines and trunks transferred to the new exchange and messages defining both line circuits related data and trunk circuit related data are sent to the exchange to which the trunk circuit has been transferred so that the call to which the message relates may be treated as a standard tandem office call. An interconnecting trunk circuit is provided between the old and the new exchange to allow for the tandem arrangement.

It is an advantage of this invention that node replacement is transparent to other nodes of the network since no modification is required of hardware or software of any nodes which communicate with a node being replaced.

BRIEF DESCRIPTION OF THE DRAWING

The invention may be better understood from the following detailed description when read with reference to the drawing in which.

Figure 3:
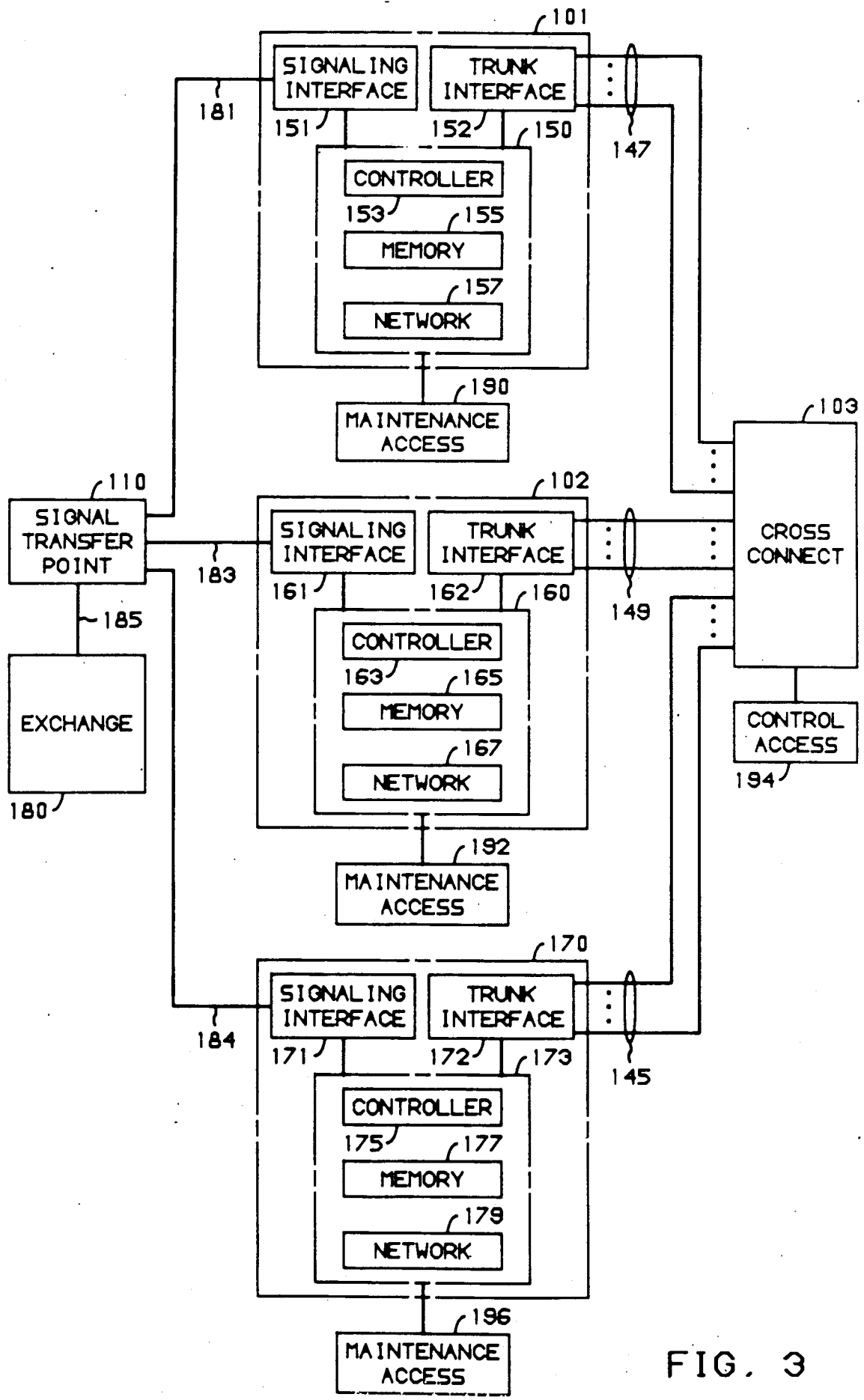
FIG. 3 is an alternate arrangement of the telecommunication system of FIG. 1.

FIGS: 10 and 11 are flow chart representations of programs executed in exchange 102 of FIG. 3.

DETAILED DESCRIPTION

Figure 1:
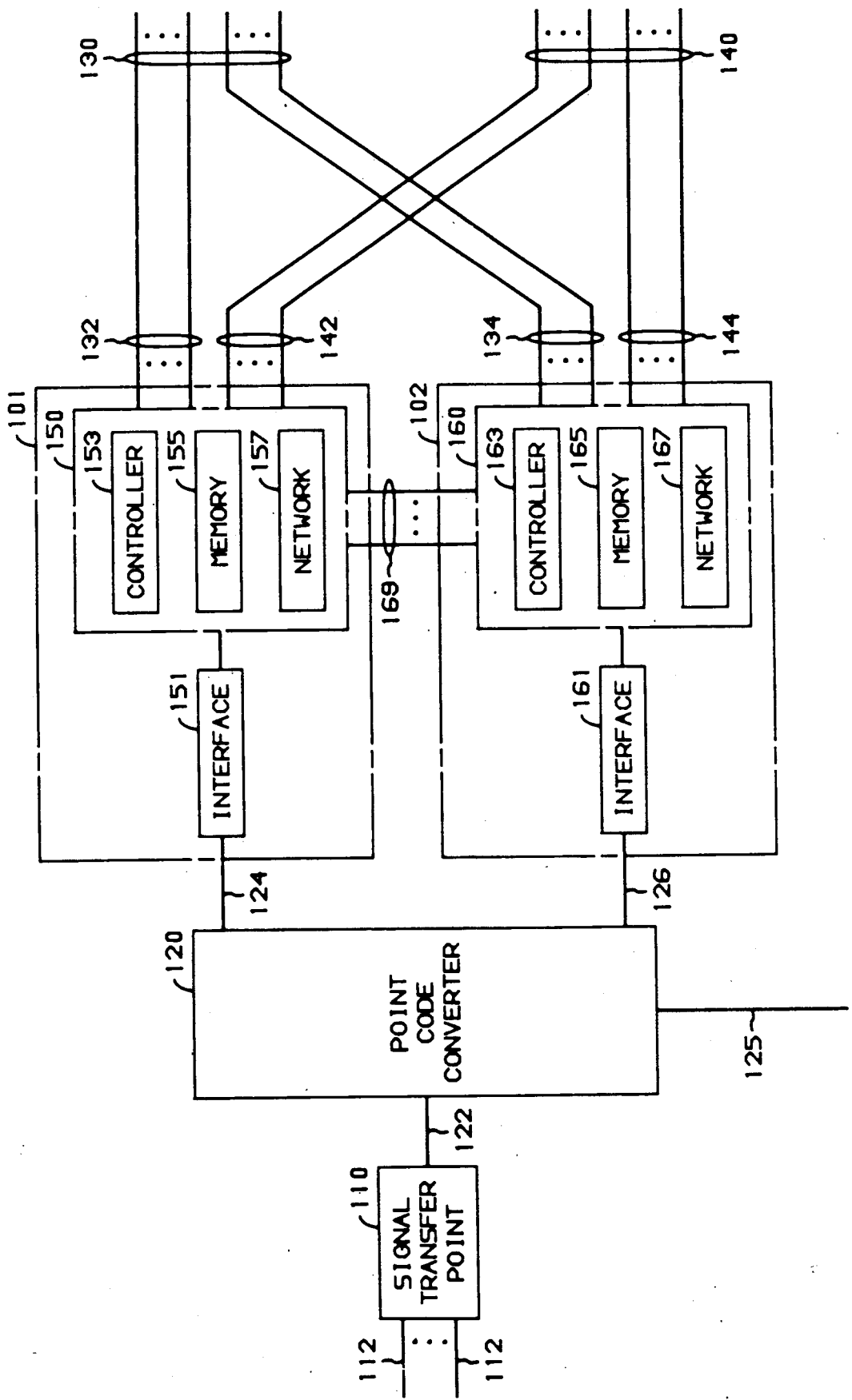
FIG. 1 is a block diagram representation of a telecommunication system having a plurality of cooperating exchanges for illustrating the invention.

FIG. 1 represents a telecommunications network comprising a plurality of telecommunications exchanges. Exchange 101 represents an existing exchange which is to be replaced by a new exchange 102. A signal transfer point 110, which is connected to a plurality of exchanges via connecting lines 112, is an access point for the network. The signal transfer point 110 and the lines which connect the signal transfer point to the exchanges of the telecommunications network are well-known in the art and form part of the CCITT/ANSI standard Signaling System 7 (SS7). In accordance with this CCITT/ANSI standard, telecommunication exchanges, which are interconnected via telecommunications trunks used in the establishment of communication paths between exchanges, use the SS7 interconnecting links and the signal transfer point 110 to exchange messages defining communications activities, e.g. telephone calls, involving the trunks. This arrangement is used in place of in-band signaling schemes commonly used in earlier systems. In the in-band signaling arrangements, the information relating to the establishment of calls was transmitted between exchanges on the trunk circuits themselves, whereas with the CCITT/ANSI SS7 arrangement signaling messages are transmitted between exchanges in the forms of packetized messages. The messages include, among other information, a destination point code, defining the exchange to which the message is addressed and an origination point code, defining the exchange from which the message originated. An exemplary representation of a signaling message is shown in Table 1.

In the arrangement of FIG. 1, standard CCITT/ANSI messages may be transmitted from any of a number of exchanges of the telecommunication network (not shown in the drawing) via signal transfer point 110 to exchange 101. Exchange 101 represents an exchange to be replaced by a new exchange 102. All messages from other exchanges addressed to exchange 101 are intercepted by a point code converter 120 which is connected to the signal transfer point 110 via link 122. The point code converter, which has been added in the network for the purpose of intercepting messages directed to the existing exchange 101 selectively routing these messages to exchange 101 via link 124 or to the new exchange 102 via link 126. The exchange 101 has connected thereto a plurality of subscriber lines 132 which are part of a larger number of subscriber lines 130, some of which are connected to the new exchange 102 and are identified as subscriber lines 134. Similarly, a number of interexchange telecommunications trunks 140 is split into a first group of trunks 142 connected to the exchange 101 and a plurality of trunks 144 connected to the exchange 102. After a subset of lines or trunks has been transferred to the new exchange and tested, the new exchange 102 will be ready to handle normal telecommunications traffic and additional subsets can be transferred until all lines and trunks are on the new exchange. The point code converter and the old exchange can be removed from the system when the change over is completed. The point code converter 120 maintains a data base which defines the identities of each of the subscriber lines and trunks moved from exchange 101 to exchange 102. When the signal transfer point 110 transmits a message for exchange 101, the point code converter 120 accepts the message, analyzes it to determine the circuit identification code and the called party number included in the CCITT/ANSI message. On the basis of that information, the converter 120 determines whether the message is to be transferred to exchange 101 or 102 and modifies the destination point code address information in the message accordingly before retransmitting the message, as will be described later herein with respect to FIG. 4 and subsequent figures.

Exchange 101 comprises an interface 151 for providing an interface to the message link 124, and a switching system 150 comprising a controller 153, a memory 155, and a network 157. Similarly, exchange 102 comprises an interface 161 which provides an interface between the link 126 and a switching system 160 which comprises a controller 163, a memory 165 and a network 167. The interface, controller, memory and network in exchanges 101 and 102 are prior art arrangements currently existing in commercially available systems and need not be described in detail herein.

Figure 2:
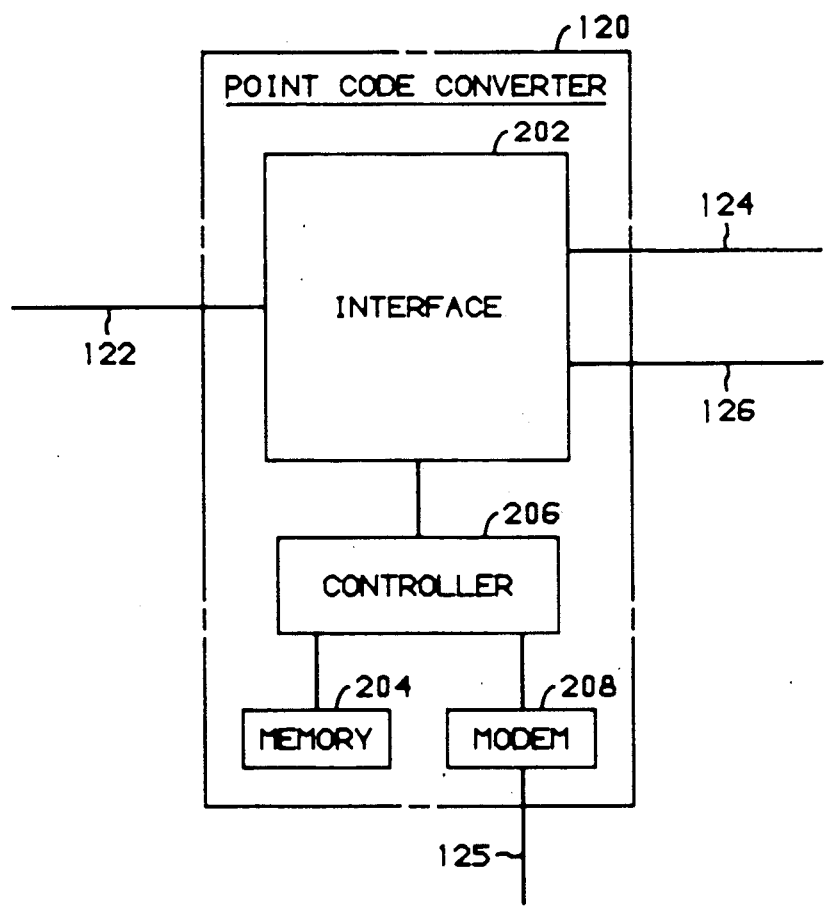
FIG. 2 is a block diagram representation of a system interface unit of the system of FIG. 1.

FIG. 2 is a block diagram representation of the point code converter 120 of FIG. 1. The point code converter comprises an interface 202 which may be identical to the known interfaces used in the exchanges such as interfaces 151 and 161. A controller 206 is a stored program controller which interacts with its memory 204 to carry out sequences of programs for analyzing incoming messages from signal transfer point 110 and retransmitting them to exchanges 101 and 102. Furthermore, messages transmitted from the exchange 102 during the change over period may have to be modified to add the originating point code assigned to the exchange 101. The destination/origination code assigned to the exchange 102 during the change over period is an arbitrarily assigned code which needs to be recognized only by exchange 101, exchange 102 and the point code converter 120. On completion of the change over procedure, the point code originally assigned to the exchange 101 will be assigned to exchange 102 and no changes with respect to point code definitions have to be made in any of the other exchanges in the system since they will continue to transmit and receive messages with the point code identification originally assigned to exchange 101 but transferred to exchange 102 as part of the change over procedure. Point code converter 120 comprises a controller 206 which may for example be the well known AT&T 3B 20-D computer described in Bell System Technical Journal. Volume 62, No 1, January 1983. The controller is connected to memory 204 which stores programs for the controller as well as data base information required by the controller in interpreting and altering point code information and messages. A modem 208 is connected to a data link and is provided to allow the initialization and updating of data in the memory 204 each time certain of the subscriber lines 130 and/or trunks 140 are transferred from exchange 101 to 102. Such transfer of lines and/or trunks is performed in a well known manner. Small groups of lines may be transferred during non-busy hours without significant interruptions of telephone service. Small numbers of trunks may be readily transferred by busying out the trunks to be transferred without disturbing telephone service.

Figure 4:
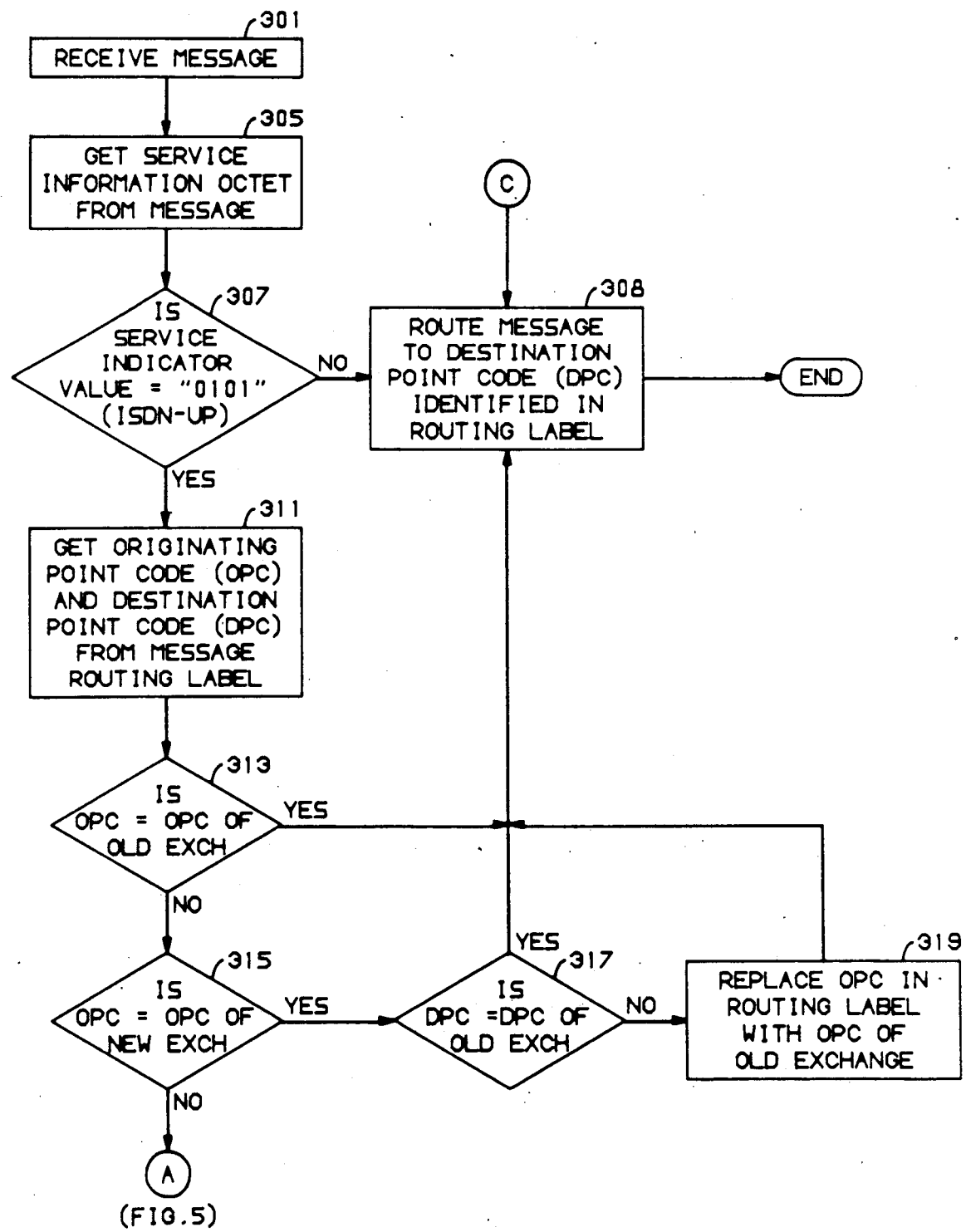
FIGS. 4 through 6 are flow chart representations of programs executed in the interface unit of FIG. 2.
Figure 5:
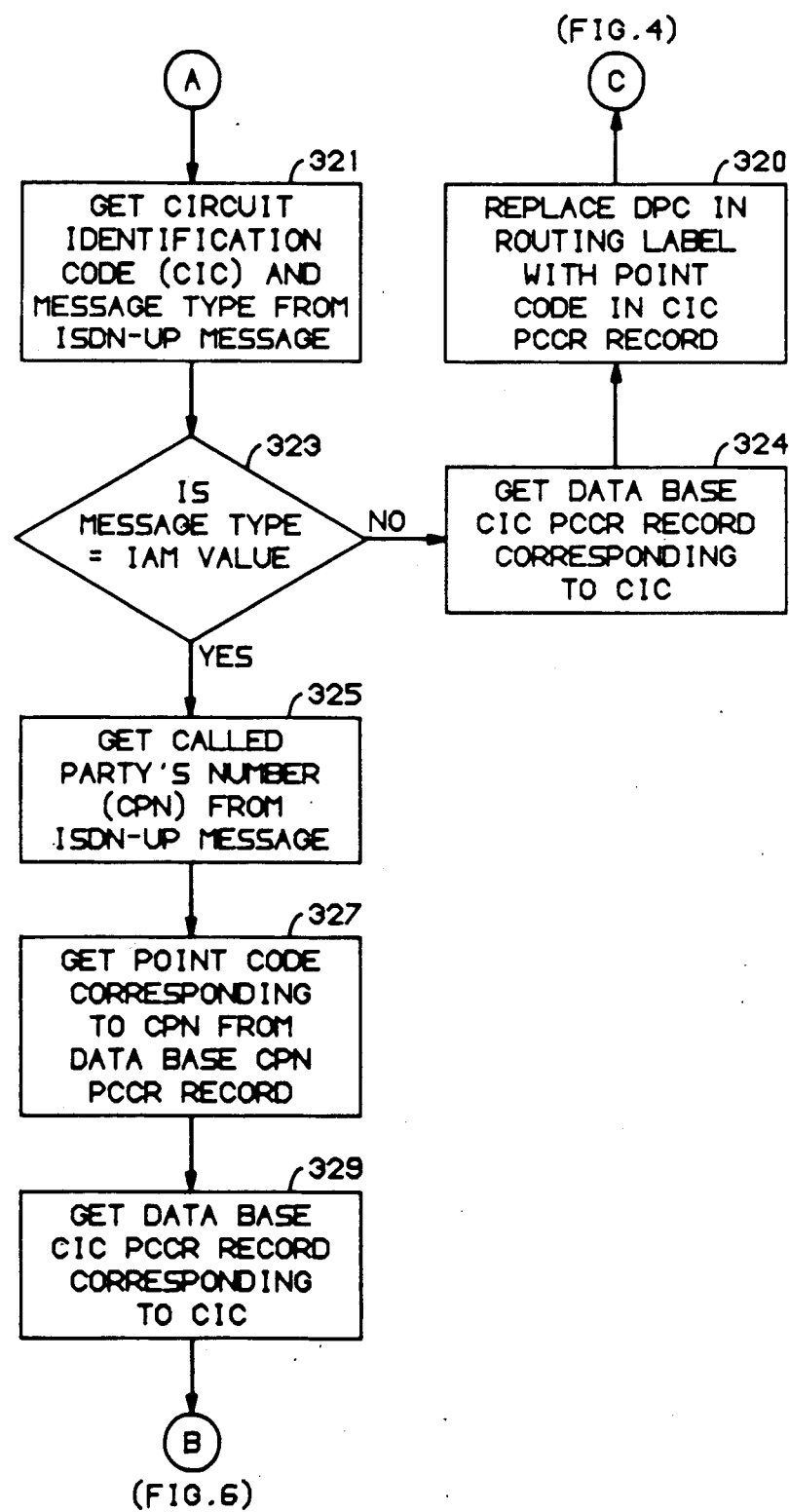

FIG. 4 is a flow chart representation of program functions executed by controller 206 on the basis of programs and data stored in the memory 204. The receipt of a message in packet format is shown in block 301 of FIG. 4. Block 305 indicates the step of reading the service information portion of the message, shown in the exemplary message format of Table 1. In decision block 307, a test is made to determine whether this information is defined as the ISDN User Part, indicating that the message will involve a trunk circuit and/or a called directory number. If it is, the message will be handled as described further with respect to block 311 and subsequent blocks. If the service indicator value is not that of the ISDN User Part, the messages routed to the destination point code in the routing label without modification by the point code converter 120, as indicated in block 308. Thereafter, the program in the is ended. If the test in block 307 indicates that the message is an ISDN User Part, the originating point code and destination point code (Table 1) are obtained from the message routing label, as indicated in block 311. A test is made in decision block 313 to determine if the originating point code is that of the old exchange, exchange 101 in this example. If so, this indicates that it is a message originating from the old exchange and destined for some other exchange and no further action is required by the point code converter. Consequently, the message is transmitted as indicated in block 308. If the test in block 313 indicates that the originating point code is something other than that of the old exchange, a further test is made in block 315 to determine if it is the originating point code of the new exchange, exchange 102 in this example. If so, a test is made in block 317 to determine whether the destination point code is that of the old existing exchange, exchange 101. If so, it indicates that this is a message from new exchange 102 to existing exchange 101 and it is transmitted without modification as indicated in block 308. If it si found in decision block 317 that the destination point code is not that of the existing exchange, i.e., it is a message to be transmitted to one of the other exchanges of the network, the originating point code in the routing label is replaced with that of the old exchange since any of the other exchanges of the system would not recognize the temporary point code which has been assigned to the new exchange for the period of change over. This action is indicated in block 319. From there, an advance is made to block 308 to transmit to the message.

If the originating point code of the message, as obtained in block 311, is not that of the old exchange or the new exchange, it is assumed that it is a message from another exchange of the network and an advance is made from decision block 315 to block 321 which represents the reading of circuit identification code and message type information from the message received in block 301. Entries for these information units are shown in the exemplary message displayed in Table 1. Decision block 323 represents the step of examining the message type information to determine whether this is an Initial Address message, which is a standard CCITT/ANSI designation indicating that this is the first packet of a sequence of packets for setting up a trunk call. If it is not the Initial Address message, the trunk circuit identification code (CIC) is obtained from the message (Table 1) and is used to determine the point code from the CIC data block in the memory 204. These actions are reflected in block 324. The point-code obtained from the data base defines the exchange to which the trunk circuit is connected. This point code is inserted as the destination point code for the message, as indicated in block 320, and the message is transmitted to the exchange as represented by block 308. If the message type information, examined in block 323, indicates that it is an Initial Address message, the message will include called party number information as indicated in an exemplary Initial Address message layout shown in Table 2. Block 325 indicates obtaining the called party number and block 327 indicates reading of the called party number/point code correlation record stored in the memory 204 of the point code converter 120. Table 3 is a representation of an entry of record in that data base. The called party number in the present example is the complete directory number including area code. The point code is a binary encoded code defining either the old exchange or the new exchange, 101, or 102, respectively. This table therefore indicates whether the subscriber line to which this directory number has been assigned is resident on the old exchange or on the new exchange. Block 329 represents the step of reading the circuit identification code/point code correlation record from the data base in memory 204. Table 4 has an exemplary layout of an entry of that record in the data base. The data base includes an entry for each trunk circuit originally assigned to the old exchange and a point code which identifies either the old or the new exchange depending on whether the trunk circuit in question is currently connected to the old or the new exchange. Decision block 331 represents a comparison of the point codes read from the called party number/point code correlation record and the circuit identification code/point code correlation record with each other and with the point code of the old exchange. If this test indicates that both the subscriber line to which the directory number is assigned and the trunk are on the old exchange, the message will be transmitted to the old exchange without further modification as indicated in block 308. If the comparison indicates that the point codes obtained from the data base are not both equal to the point code of the old exchange, a test is made, as indicated in block 333 to determine whether both are equal to the point code of the new exchange. If so, this is an indication that both the subscriber line and the trunk involved in a call are currently connected to the new exchange. In that case, the destination point code of the message is replaced with the destination point code of the new central office, as indicated in block 341. Thereafter, the message is transmitted to the new exchange with the new destination point code as indicated in block 308. In the event that the point codes are not equal to each other and equal to the point code of either the old or the new exchange, a further test is made as indicated in block 335. If it turns out that the point code recorded in the data base indicates that the trunk circuit involved in the call is connected to the new exchange and the subscriber line to be reached is connected to the old exchange, the message is routed to the new exchange as indicated in block 343 and the function is ended. In this case, standard call processing programs in the new exchange treat the call as a tandem call since the requested subscriber line is not on the new exchange. Consequently, a tandem connection will be established via tandem trunk 169 from the identified trunk in the new exchange to the identified subscriber line in the old exchange using normal tandem trunk signaling.

Figure 6:
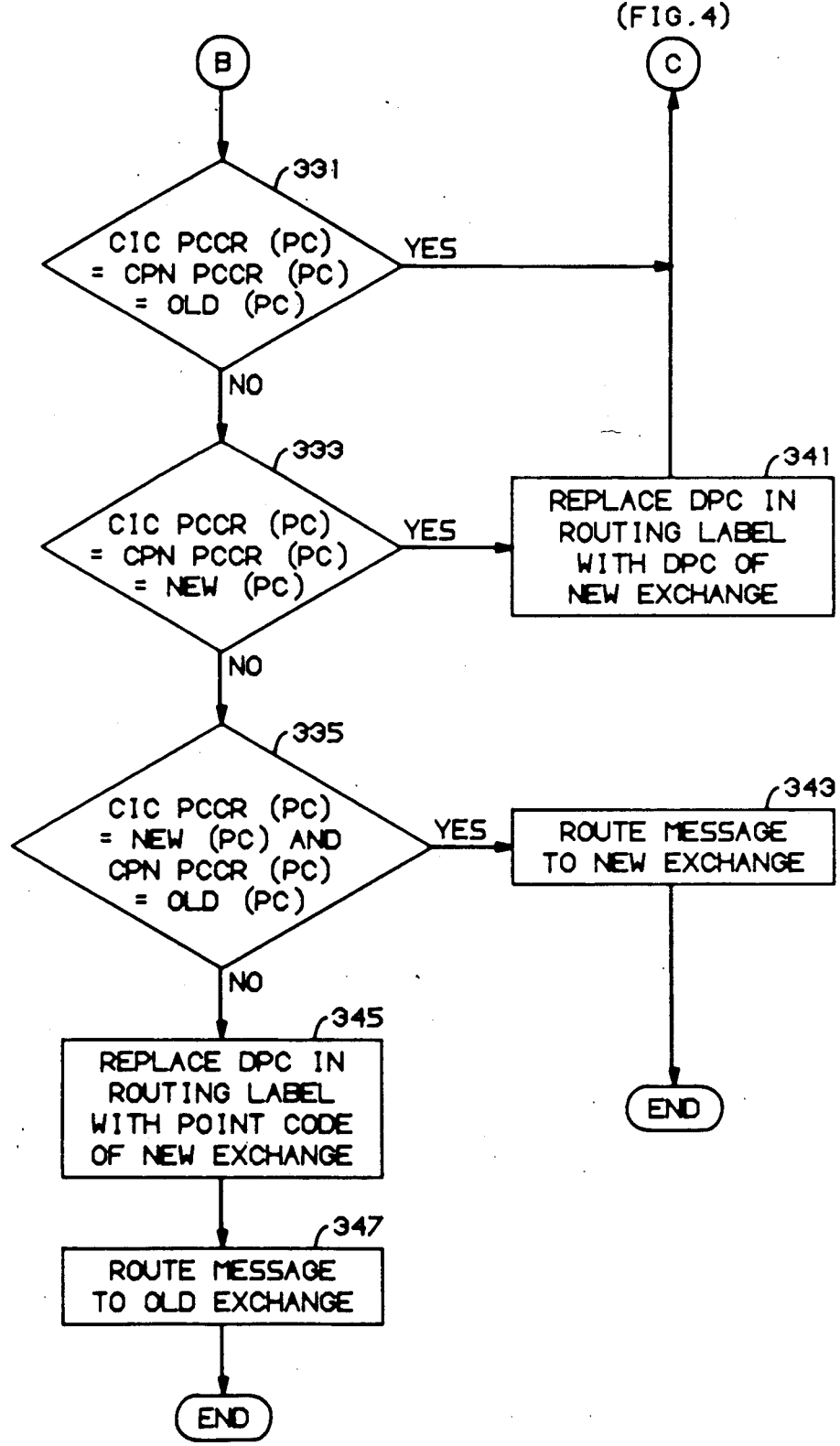

If it is determined in the test represented by decision block 335 (FIG. 6) that the tested condition is not true, then it is assumed that the trunk circuit identified by the message is resident on the old exchange and the line corresponding to the called directory number is on the new exchange. In that case, the destination point code in the routing label is replaced with that of the new exchange, as indicated in block 345, and the message is routed to the old exchange, which will set up a tandem connection to the new exchange in order to complete the call as described above with respect to block 343. This action is reflected in block 347. Thereafter, the function is ended.

FIG. 3 is a block diagram representation of an alternate embodiment of a telecommunication system for illustrating the invention. FIG. 3 shows the signal transfer point 110 directly connected via signaling link 181 to an existing exchange 101 and via signaling link 183 to a new exchange 102. Exchange 102 is intended to replace the existing exchange 101, as described earlier with respect to FIG. 1. The signal transfer point is connected via signaling links 184 and 185 to other exchanges 170 and 180, referred to as far exchanges herein. In accordance with the embodiment of FIG. 3, communications between the far exchange 170 and the new exchange 102 are used to test interoffice trunk connections 149 to the new exchange 102. Each trunk of the plurality of trunks 149 can be individually tested and flash cutover is made from the existing office 101 to the new office 102 after all trunk circuits have been completely tested. A cross connect facility 103 is used to selectively connect trunk circuit 145, connected to far exchange 170, to either corresponding ones of the trunks 147, connected to the existing office 101, or to corresponding ones of the trunks 149, connected to the new office 102. The cross connect 103 may be any of a number of commercially available cross connects and may for example be the AT&T Digital Access and Cross-Connect System III, which is commercially available. The cross connect responds to external control signals, such as digital messages from a control access unit 194, to selectively interconnect trunk circuits connected to its ports. Each of the plurality of trunks 145, 147 and 149 is connected to one such port of the cross connect 103. The exchanges 101 and 102 comprise switching systems 150 and 160, respectively, as described previously with respect to FIG. 1. In a similar manner exchange 170 comprises signaling interface 171 for connection to signal transfer point 110, trunk interface 172 for connection to interexchange trunks 145, and a program controlled switching system 173, including a controller 175 cooperating with memory 177 to control network 179 to establish telecommunication connections in a well known fashion.

To minimize errors at final cutover, each of the trunk circuits 149 is tested on the new exchange before final cutover. To test the connection of the trunks 149 to the new exchange 102, the cross connect 103 is configured to connect a selected subset of the trunks 145 to a selected corresponding subset of the trunks 149. The switching system 150 of the exchange 101, by means of its controller 153 places the selected one of the trunks 147 in an out-of-service state, which is a common practice to prevent a trunk from being used for normal traffic purposes. Placing a trunk in the out-of-service state in exchange 101 includes sending a signaling message identifying the trunk to the signal transfer point 110. The signal transfer point, in accordance with Signaling System 7 procedures, transmits a corresponding message to the far exchange (e.g., 170) to which the other end of the trunk is connected, causing the trunk to be placed in the out-of-service state in the far exchange also. The removal of trunks from service and reconfiguration of cross connect 103 can be coordinated by maintenance personnel which will have access to the exchanges via standard maintenance access units 190, 192, 196 and to the cross connect via control access 194. The exchanges 101, 102 and 170 may be any number of well known telecommunication exchanges. For example, the old existing exchange 101 may comprise the commercially available AT&T 1A ESS TM switch and the exchange 102 and 170 may comprise the AT&T 5ESS ° switch.

In the event that new trunks are added to the new exchange 102, i.e., trunks not initially assigned to exchange 101, these trunks may also be tested via exchange 101. In this illustrative embodiment, message addressed to the old exchange 101 are intercepted at the old exchange and if the trunk identified in the message is not a trunk assigned to the old exchange, the message is forwarded to the new exchange 102, in the same fashion as messages for transferred trunks.

To test the operation of trunks on the new exchange 102, the far exchange 170 is used to send CCITT/ANSI messages pertaining to the trunks temporarily connected to exchange 102 via cross connect 103. The CCITT/ANSI messages, which include a destination point code (address code) and an originating point code, are transmitted by switching 173 via signaling interface 171 and signaling link 184 to the signal transfer point 110, and addressed to the old exchange 101. Exchange 101 will receive the message via signaling link 181 and signal interference 151. Its controller 153, with reference to data stored in its memory 155, will change the destination point code to a temporary point code temporarily assigned to the new exchange 102. The temporary point code destination is referred to herein as a pseudo point code and is assigned to the new exchange only during the trunk test period. Additionally, the exchange 101 writes the originating point code of the message to a special parameter created in the message and inserts its own point code in the message. Thereafter the message is transferred back to the signal transfer point 110 and transmitted to new exchange 102 via signaling link 183 and its signaling interface 161. In order for the signal transfer point 110 to relay the message, it is necessary that the signal transfer point be adopted to recognize the pseudo code, which is done by standard change procedure. The new exchange 102, may also transmit messages to far exchange 170. These messages are formulated at the new exchange with a destination point code corresponding to that of the old exchange 101 and an originating point code corresponding to the pseudo point code assigned to the new exchange 102. The point code of the far exchange 170 is written into the special parameter. The message is transmitted via link 183 to the signal transfer point 110, which relays the message via link 181 to the old exchange 101. The existing old exchange enters the far exchange point code in the message as the destination point code and transmits the message with an originating point code corresponding to that of the old exchange 101.

After all of the trunks 149 have been tested, the trunks 149 may be directly connected to trunks 145 and the cross connect 103 with its connections to the old exchange 101 may be removed. At the same time, the new exchange 102 is modified to adapt the point code for old exchange 101 and old exchange 101 is effectively disconnected from the signal transfer point 110. In a flash cut operation, the subscriber lines shown to be connected to the old exchange 101 are transferred to the new exchange 102, such that complete telephone service can be offered from the new exchange 102. The arrangement does not require modification of the other exchanges in the network such as exchanges 170 and 180 to accommodate the pseudo code assigned to the new exchange 102. In this illustrative embodiment, the old exchange is modified to intercept and forward messages relating to trunks moved on the new exchange, in order to make the new exchange transparent to the remainder of the network. Alternatively, modifications may be made to the signal transfer point 110 to intercept messages for trunks moved to the new exchange. That is, the functionality necessary for the interchange of the point codes in the messages could be readily incorporated in the signal transfer point instead of the old exchange.

Figure 7:
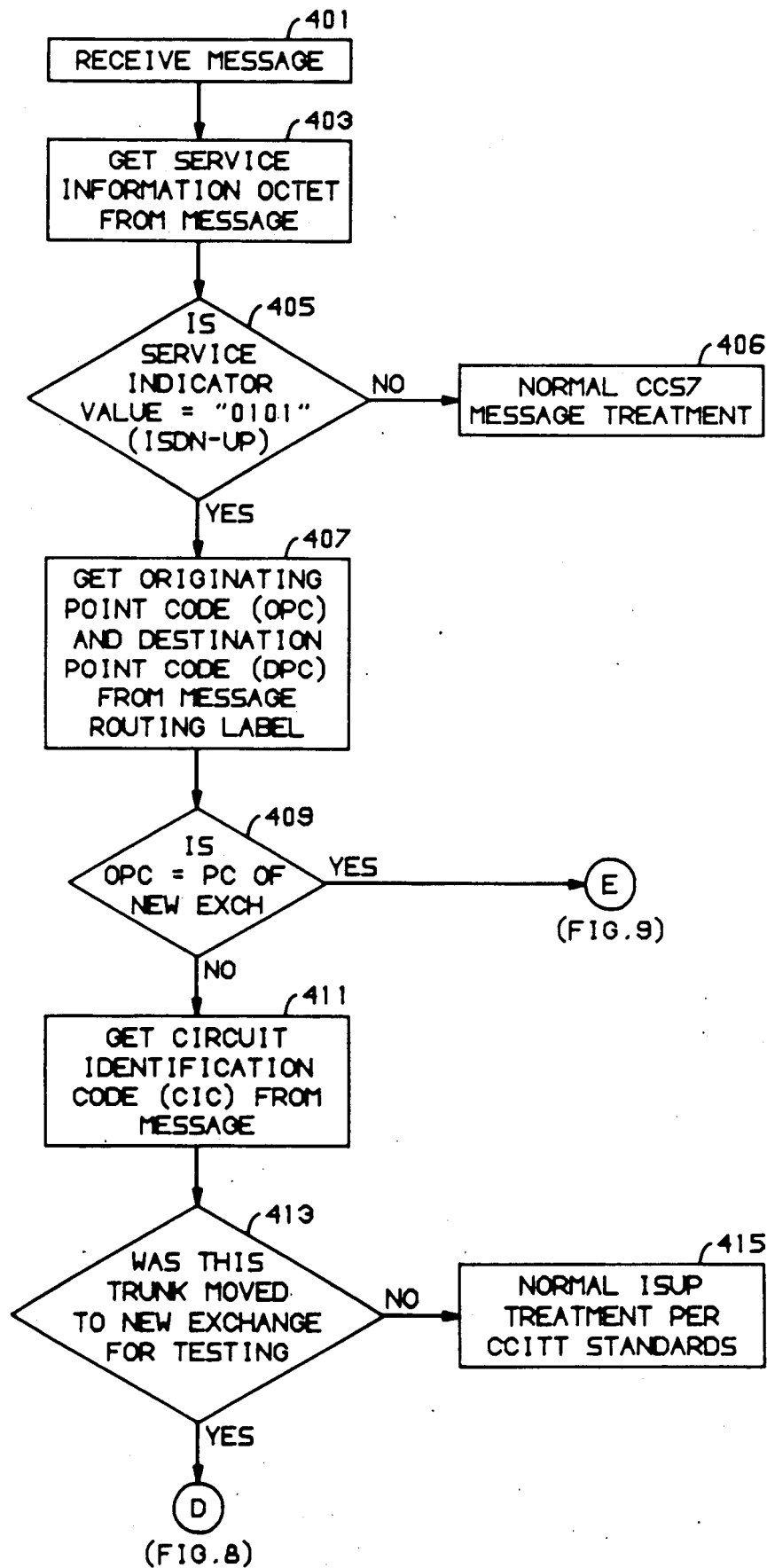
FIGS. 7 through 9 are flow chart representations of programs executed in exchange 101 of FIG. 3.
Figure 8:
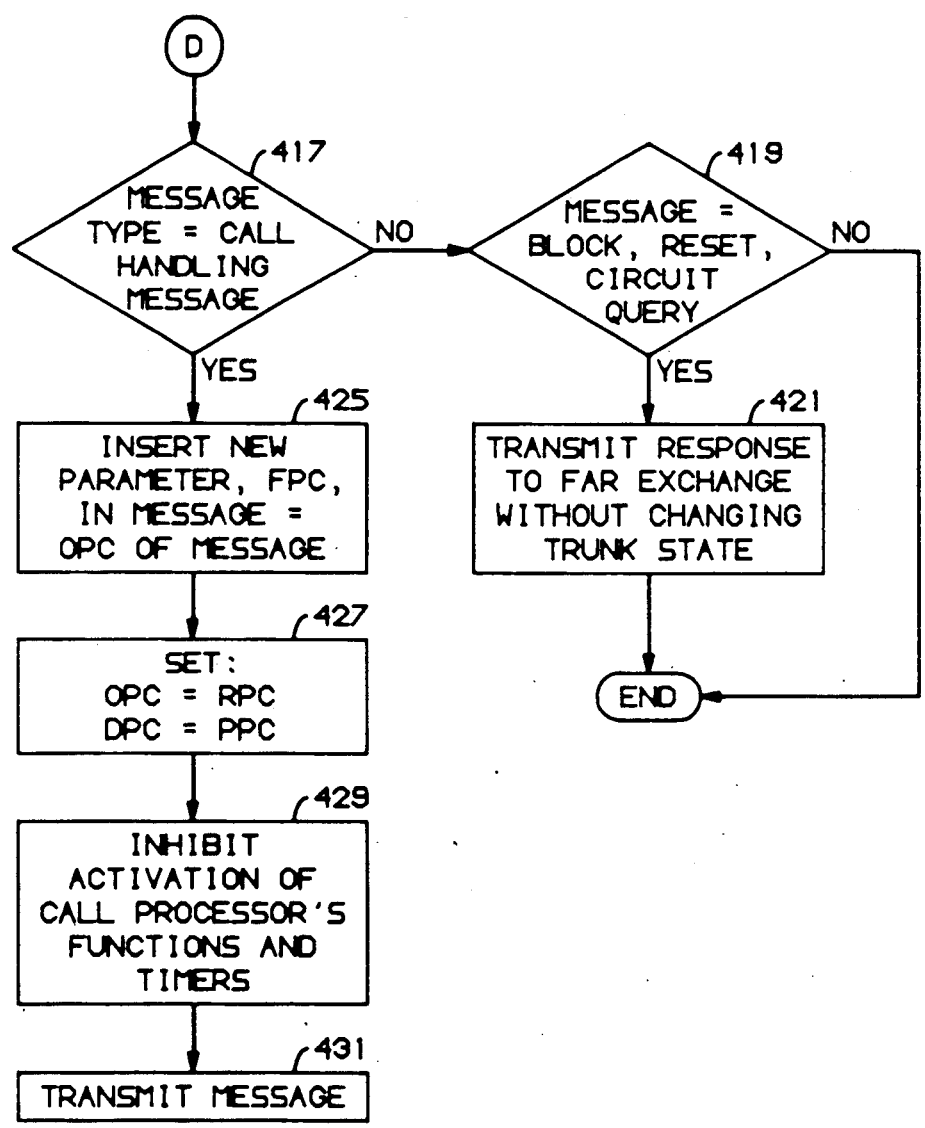
Figure 9:
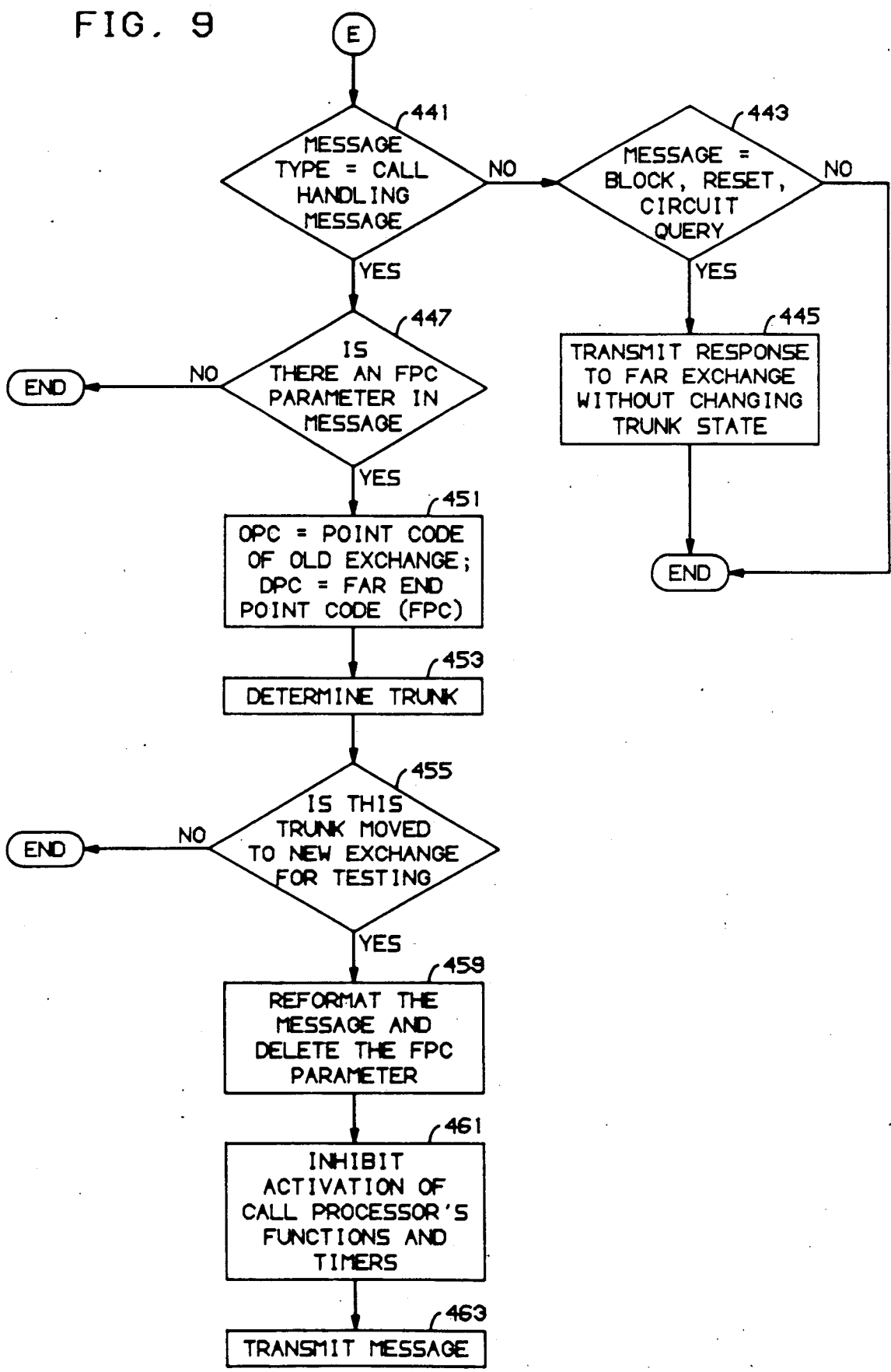

FIGS. 7 through 9 are flow chart representations of actions taken by programs executed in the controller 153 in existing old exchange 101, with reference to data stored in the memory 155. Block 401 of FIG. 7 indicates receiving of a Signaling System 7 message which is transmitted from the exchange 170 via signaling link 184 to the signal transfer point 110 and via signaling link 181 to exchange 101. An exemplary message is depicted in Table 1. Block 403 indicates that the service information is obtained from the message. A test is made in block 405 to determine whether the indicator shows this to be an ISDN User Part message, which contains specific information pertaining to action with respect to trunk circuit in Signaling System 7 message format. If not, normal message handling is performed as specified by CCITT/ANSI standards, as indicated in block 406. If it is a message relating to trunk circuit activity, the origination and destination point code information is obtained from the message as indicated in block 407. A test is made, as indicated in block 409, to determine whether the origination point code of the message is the pseudo point code which has been assigned to the new exchange 102. If this is not the case, the circuit identification code is obtained from the message (Table 1) as indicated in block 411. Block 413 represents a test to determine whether the trunk identified by the circuit identification code has been selected for testing or is an unassigned trunk, signaling that this may be a new trunk assigned to the new exchange. As part of the change over procedure, the existing old exchange 101 is modified to record in its memory 155 a special maintenance state for trunks which are connected via the cross connect 103 to new exchange 102. Table 8 is an exemplary memory table entry for recording whether the corresponding trunk is in the special maintenance state, a logical 1 representing the special state. This state information is used to determine whether the trunk has been moved to the new exchange. If it is an unassigned trunk, it is not recorded in the old exchange.

If it is determined from the test in block 413 that this is not a trunk which has been selected for testing at the new exchange or an unassigned trunk, normal CCITT-/ANSI ISDN User Part treatment is provided, as indicated in block 415. If it is a trunk selected for testing or is unassigned, the message type information of the message is examined to determine whether this is a call handling message or a maintenance related message of which there are several defined by CCITT/ANSI, as indicated in block 417 of FIG. 8. If it is not a call handling message, it is assumed that it is a maintenance message or an acknowledge message which will not be forwarded to the new exchange. Nevertheless, a test is made as indicated in block 419, to determine whether it is a blocking, reset, or circuit query message, for which the sending exchange (e.g., 170) expects a standard response. Such a response is sent from the old exchange 101, as indicated in block 421. However, no action is to be taken in the old exchange to execute the functions defined by the messages. After transmitting the response or if the message is simply an acknowledge message, the function is ended. If the test in block 417 indicates that this is a call handling message, a new parameter, which is the far end exchange point code, is inserted in an available field of the message. This parameter is the originating point code of the message, e.g., the point code of exchange 170 from which the message was transmitted. This action is shown in block 425. In block 427 the originating point code field of the message is set equal to the real point code (RPC) which is the point code of the existing exchange 101, which is known to the other exchanges in the network. Furthermore, the destination point code of the message is set equal to the pseudo point code (PPC) which has been assigned to the new exchange 102 for the purposes of these tests, as shown in block 427. Block 429 indicates inhibiting activation of call processor functions and timers in the existing exchange 101. Such functions and timers would normally be activated in the case of the handling of the message relating to real traffic situations. However, in this embodiment of the invention the messages are not executed in this exchange and these functions are specifically inhibited. Block 431 indicates the transmission of the message to the signal transfer point 110, which will forward the message to the new exchange 102. Thus, in the sequence of steps described above, a message from a far exchange to the existing exchange 101 has been relayed after the message has been modified by recording the identity of the far exchange in the message, substituting the point code of the existing exchange 101 for that of the originating exchange and substituting the point code of the new exchange for that of the old exchange. In this manner, a message intended for the new exchange for the purpose of testing the connection of the new exchange to a selected set of trunks has been intercepted and forwarded to the exchange under test without the need for modification of all of the exchanges of the telecommunications network communicating with the unit being tested.

If it is determined in the test of block 409 of FIG. 7, that the originating point code of the message is the point code of the new exchange, indicating that the message was transmitted from the new exchange 102 to the existing exchange 101, the message type code in the received message is examined, as indicated in block 441 of FIG. 9. This may be, for example, a maintenance message or a call handling message. If it is a maintenance message, a further test is made, as indicated in block 443, to determine whether it is a message for which the new exchange 102 expects a response or simply an acknowledge message. If a response is expected, it is sent to the new exchange, as indicated in block 445, but no action is taken in the old exchange with respect to the trunk identified in the message. Thereafter, the program sequence is ended. Similarly, the program is ended if no response is required. The reason why the response is sent but no action is taken by the old exchange is that the new exchange provides a screening function for messages generated by the new switch, without impact on live traffic.

If the message type, as examined in block 441 of FIG. 9, indicates that this is a call handling message, the message is examined to determine if there is a far point code parameter in the message. An exemplary message showing this code is shown in Table 5. The far point code entry is not a part of the CCITT/ANSI standard signaling message and is added in an available space of the message for the purposes of communicating the identity of the far exchange in messages between the existing exchange 101 and the new exchange 102 during the test or changeover. If the test of block 447 indicates that there is no far exchange point code (FPC) parameter in the message, the program sequence is ended since this indicates that the message received from the new exchange 102 is incomplete and cannot be handled in the old exchange 101 in the intended fashion. Assuming that the FPC parameter is found in the message, the point code of the old exchange is inserted in the originating point code (OPC) field of the message and the far end point code (FPC) is inserted in the destination point code (DPC) field of the message, as indicated in block 451 of FIG. 9. Thereafter, the circuit identification code (CIC) is read from the message to identify the trunk circuit to which the message relates. This information is obtained from a table in memory 155 defining trunk equipment numbers in association with circuit identification codes. An exemplary entry of such a table is shown in Table 6. The step of determining the trunk identity is indicated in block 453. Block 455 represents a test on information stored in memory defining trunks in the special maintenance state, as exemplified in Table 8, to determine whether the trunk has been moved to the new exchange for test purposes or if it is an unassigned trunk in the old exchange, indicating that it is a new growth trunk on the new exchange. If the data in memory does not indicate that this trunk has been moved to the new exchange or unassigned, the sequence is ended since it is assumed that the message was sent erroneously. Assuming that the trunk circuit identified in the message is in fact one that has been moved to the new exchange for test purposes, the message is reformatted with the new point code information and deleting the far point code (FPC) parameter from the message since this parameter was added only for the purposes of communications between the old and new exchanges 101 and 102. This action is reflected in block 459. Thereafter, as indicated in block 462, activation of call processing functions and timer functions which would otherwise be activated in connection with live telephone traffic, are inhibited. Subsequently, the message is transmitted as indicated in block 463. In summary, in the sequence of actions represented by the blocks labeled 411 through 431 represent the receipt at the old exchange 101 of a message pertaining to trunk circuit which have been transferred for test purposes to the new exchange 102, and forwarding the message to the new exchange. The actions represented by the blocks in the range of numbers from 441 through 463 represent the receipt in the old exchange 101 of a message originated from the new exchange 102 and destined for a far end exchange involved in the test, and inserting the destination code for the far exchange in the messages in the old exchange 101, prior to transmission of that message on the signaling network via the signal transfer point 110.

Figure 10:
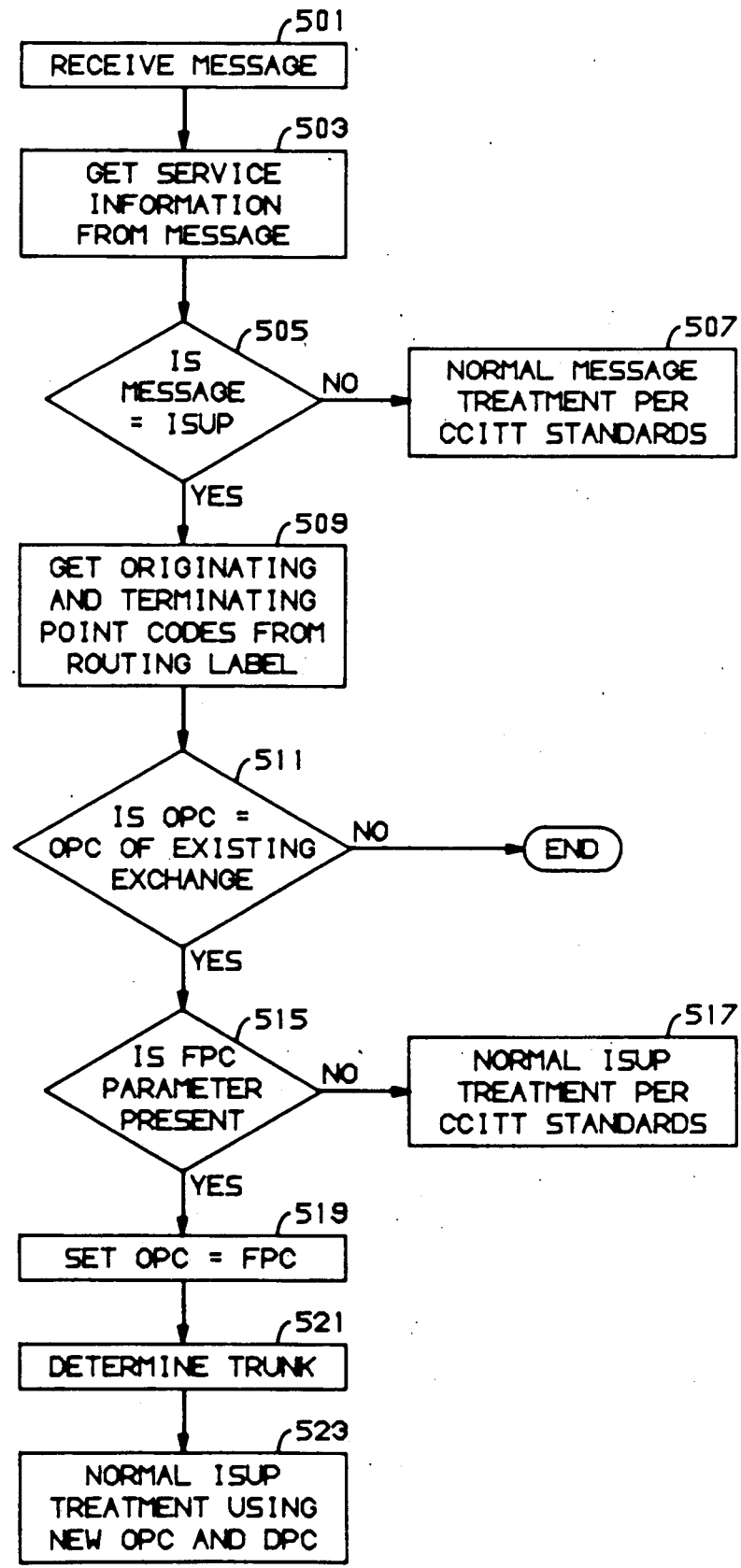
Figure 11:
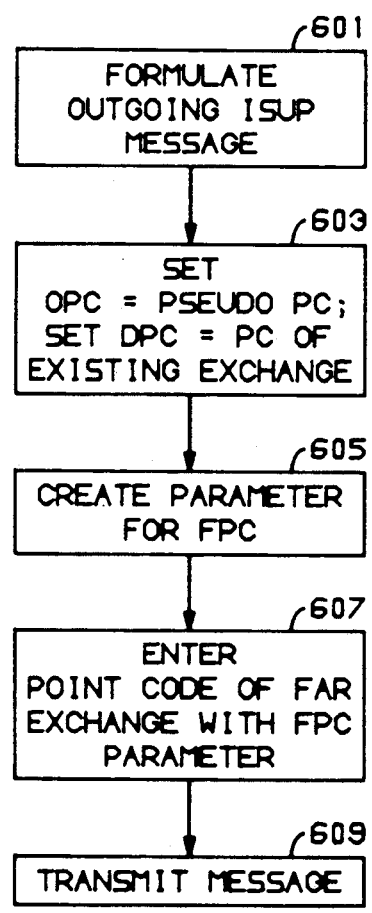

Certain software sequences are carried out in the new exchange 102 for purposes of handling signaling messages used in connection with tests of trunk circuit connections to the new exchange. As indicated earlier, messages to perform tests on a selected group of trunks connected temporarily to the new exchange 102 may be communicated between exchange 102 and a far end exchange e.g., exchange 170 via the signal transfer point 110 and the existing exchange 101, as discussed in the preceding paragraphs. The special actions required in the new exchange 102 to handle signaling messages during the exchange change over period are indicated in FIGS. 10 and 11. Block 501 of FIG. 10 indicates the receipt at the new exchange 102 of a signaling message from the signal transfer point 110. The signaling message, an example of which is shown in Table 1 includes service information parameters. Block 503 of FIG. 10 indicates a step of obtaining the service information from the message and block 505 indicates a test to determine whether the service information indicates that this is an ISUP message, meaning a message relating to trunk circuit activity. If not, normal message treatment per CCITT/ANSI standards will be provided as indicated in block 507. If it is an ISUP message, the originating and terminating point code routing labels are obtained from the message as indicated in block 509. A test is subsequently made, as indicated in block 511, to determine whether the originating point code is that of the old exchange 101. If not, it is assumed that the message has reached the new exchange 102 through some error condition and the message is discarded and the program sequence is ended. If the originating point code is that of existing exchange 101, a test is made as indicated in block 515 to determine whether the message contains an FPC parameter, defining the point code of a far end exchange. An exemplary signaling message with such a parameter is shown in Table 5. As discussed in previous paragraphs, the FPC parameter is not a standard CCITT or ANSI parameter and is used only in communications between the existing exchange 101 and the new exchange 102 for the purpose of precut over testing. The FPC parameter defines a far end exchange in case the message originated from a far end exchange and was transmitted to the new exchange 102 after having been handled by the existing exchange 101. If the message is a direct message from the existing exchange 101 to the new exchange 102, the FPC parameter will not be present in the message and standard treatment will be provided in the new exchange 102. Assuming that the FPC parameter is present in a message, the originating point code field, is set equal to the far end point code (FPC), as indicated in block 519. Thereafter, the identify of the trunk to which the message pertains is obtained by reading the circuit identification code from the message, as indicated in block 521, to obtain a trunk equipment number by reading a table in memory 165. An exemplary entry of that memory table is shown in Table 7. Thereafter, normal treatment of the message for all call processing purposes, is subsequently carried out, as indicated in block 523.

The transmittal of a signaling message from the new exchange 102 to a far end exchange involved in trunk testing, for example exchange 170, requires the execution of certain special functions in the new exchange 102. Specifically, a message destined for the far end exchange is provided with the destination point code of the existing exchange 101 and with an originating point code which is the pseudo point code assigned to the new exchange 102. Additionally, the new exchange must insert the point code of the far end exchange in the area of the message designated for the far end point code parameters. The existing exchange 101 will retransmit the message by entering the point code of the far exchange in the destination point code field of the message. FIG. 11 is a flow chart representation of program functions executed by the controller 163 of the new exchange 102. Block 601 indicates the formulation of the outgoing ISUP message in accordance with the CCITT/ANSI standards, as is commonly done in exchanges which utilize the Signaling System 7 interexchange messaging arrangement. In the new message, the originating point code field (OPC) is set equal to the pseudo point code of the new exchange 102 and the destination point code (DPC) is set equal to the point code of the existing exchange 101, as indicated in block 603. Block 605 indicates the step of creating a parameter in the outgoing message for the far point code (FPC), which has been designated for communications between the existing exchange 101 and the new exchange 102. Block 607 indicates a step of entering in the message, in association with the FPC parameter, the point code of the far end exchange (e.g., 170) involved in the testing of trunks to the new exchange 102. Block 690 shows the step of transmitting the message via the signal transfer point 110 to exchange 101 for further transfer to the far exchange 170.

It is to be understood that the above-described arrangement is merely an illustrative application of the principles of the invention; numerous other arrangements may be devised by those skilled in the art without departing from the spirit and scope of the invention.

TABLE 1

SIGNALING MESSAGE

|  |
| --- |
|  |
|  |
| Service Information |
| Destination Point Code |
| Origination Point Code |
|  |
| Message Type Code |
|  |
|  |
|  |

TABLE 2

INITIAL ADDRESS MESSAGE

|  |
| --- |
|  |
| Service Information |
| Destination Point Code |
| Origination Point Code |
|  |
| Circuit Identification Code |
| Message Type Code |
|  |
| Called Party Number |
|  |

TABLE 3

| Called Party Number | Point Code |
| --- | --- |
| 708-555-1212 | 01------ |

TABLE 4

| Circuit Identification Code | Point Code |
| --- | --- |
| 010------ | 10------ |

TABLE 5

| SIGNALING MESSAGE |
| --- |
| Service Information |
| Destination Point Code |
| Origination Point Code |
|  |
| Circuit Identification Code |
|  |
| Message Type Code |
| Far Point Code |
|  |
|  |
|  |

TABLE 6

| Circuit Identification Code | Trunk Eq. No. | New Exchange |
| --- | --- | --- |
| 010------ | XX XX | 1 |

TABLE 7

| Circuit Identification Code | Trunk Eq. No. |
| --- | --- |
| 010---------- | XXXX |

TABLE 8

| Cirucit Identification Code | State |
| --- | --- |
| 010----------;--- | 1 |

We claim:

1. In a system comprising a plurality of cooperating nodes interconnected by a message transfer network and communicating via messages including data defining functions to be performed in a node receiving a message, apparatus for transferring functional capability from a first node to a second node comprising:
    data storage means in said first node for storing data defining functions assigned to at least one of said first and said second nodes;
    means responsive to receipt of a message addressed to said first node for execution of a function in said first node for comparing function defining data of said received message with data stored in said data storage means; and
    means for transmitting said received message from said first node to said second node when a function defined by said received message is defined in said data storage means as a function assigned to said second node.

2. The arrangement in accordance with claim 1 wherein said apparatus comprises interface means connected to said message transfer network and to said first and said second nodes and comprising means for transmitting to said first node messages defining functions not assigned to said second node.

3. The arrangement in accordance with claim 2 wherein each of said nodes comprises a telecommunication exchange, wherein said first node comprises a first exchange and said second node comprises a second exchange, and wherein said functions relate to interexchange telecommunications trunk circuits.

4. The arrangement in accordance with claim 1 where said first and second nodes are connected to a signal transfer network and said means responsive to receipt of a message addressed to said first node is further responsive to messages defining functions not assigned to said second node to execute said functions.

5. The arrangement in accordance with claim 1, and further comprising means, separate from a signaling network interconnecting said first and second nodes, for interconnecting said first and said second node for establishing tandem telephone connections between said first node and said second node.

6. In a system comprising a plurality of cooperating nodes interconnected by a message transfer network and communicating via messages including data defining functions to be performed in a node receiving a message, apparatus for transferring functional capability from a first node to a second node comprising:
    data storage means for storage data defining functions assigned to at least one of said first and said second nodes;
    means responsive to receipt of a message addressed to said first node for comparing function defining data of said received message with data stored in said data storage means; and
    means for transmitting said received message to said second node when a function defined by said received message is defined in said data storage means as a function assigned to said second node;
    wherein said functions to be performed relate to equipment connected to said nodes and wherein said data storage means defines equipment moved from said first node to said second node.

7. The arrangement in accordance with claim 6 wherein said nodes are telecommunication exchanges and said equipment comprises interexchange trunk circuits, identified in said message, and wherein said data storage means stores data identifying trunk circuits and indicia identifying one of said first and second exchange in association with said trunk circuits identifying data.

8. The arrangement in accordance with claim 6 wherein said nodes comprise telecommunication exchanges and said equipment comprises trunk circuits interconnecting said nodes for the transfer of telecommunication traffic among said nodes and said apparatus further comprises means for selectively connecting trunk circuits from a third node to either said second or said first node.

9. In a system comprising a plurality of cooperating nodes interconnected by a message transfer network and communicating via messages including data defining functions to be performed in a node receiving a message, apparatus for transferring functional capability from a first node to a second node comprising:
    data storage means for storing data defining functions assigned to at least one of said first and said second nodes;
    means responsive to receipt of a message addressed to said first node for comparing function defining data of said received message with data stored in said data storage means; and means for transmitting said received message to said second node when a function defined by said received message is defined in said data storage means as a function assigned to said second node;

wherein said apparatus comprises interface means connected to said message transfer network and to said first and second nodes and comprising means for transmitting to said first node messages defining functions not assigned to said second node;

wherein each of said nodes comprises a telecommunication exchange, wherein said first node comprises a first exchange and said second node comprises a second exchange, and wherein said functions relate to interexchange telecommunications trunk circuits;

wherein said functions further relate to subscriber line circuits connected to said exchanges and said data storage means stores data identifying line circuits and trunk circuits and indicia identifying one of said first and second exchanges associated with said line circuits and trunk circuits identifying data.

10. In a system comprising a plurality of cooperating nodes interconnected by a message transfer network, wherein the nodes communicate via messages including destination address information and indicia identifying functions to be executed, the method of substituting a new node for a selected node of the network on a real time basis, comprising the steps of:

recording indicia defining functions of the selected node assigned for execution by the new node;

intercepting a message from another node of the network addressed to the selected node;

comparing function identifying indicia of the intercepted message with the recorded indicia; and transmitting the intercepted message to the new node when the comparing step indicates that the function defined in the message is a function assigned to the new node.

11. The method in accordance with claim 10, wherein the messages further include origination address information and further comprising the steps of:

transmitting messages from the new node;

intercepting messages transmitted from the new node destined for another node in the network;

modifying messages transmitted from the new node by inserting origination address indicia identifying the selected node in the messages; and 12. The method in accordance with claim 10 wherein the new node is assigned a temporary address and the step of transmitting comprises the steps of modifying the intercepted message by substituting the temporary address assigned to the new node for the destination address information of the message and transmitting the message on the network.

13. The method in accordance with claim 10 and further comprising the steps of:

transmitting from the new node a message addressed to the selected node and destined for another node of the network;

intercepting the message transmitted by the new node;

substituting in the message, destination address information defining the other node; and transmitting the message via the network to the other node.

14. The method in accordance with claim 13 wherein the message further comprises origination address information and said step of substituting comprises the step of entering in the message, origination address information identifying the selected node as an originating node.

15. The method in accordance with claim 10 wherein the plurality of cooperating nodes each comprise telecommunication exchanges including trunk circuits for establishing telecommunication connections to cooperating exchanges and certain of the telecommunication connections are moved from an exchange of the selected node to an exchange of the new node, the functions to be executed comprise functions pertaining to specific trunk circuits identified in the messages, wherein the step of recording comprises the step of recording identities of trunk circuits and address indices defining the one node of the selected and the new node to which the trunk circuits are connected and wherein the step of transmitting comprises the step of substituting the recorded address indices corresponding to a trunk circuit identified in the intercepted message as destination address information in the intercepted message.

16. In a telecommunication system comprising a plurality of cooperating exchanges and a signaling network interconnecting the exchanges for the transfer of interexchange signaling messages defining functions to be performed in a receiving exchange with respect to interexchange trunk circuits defined in the messages, the method of substituting a new exchange for a selected one of the plurality of cooperating exchanges, wherein the selected exchange comprises a plurality of trunk circuits, the method comprising the steps of:

transferring a subset of the plurality trunk circuits from the selected exchange to the new exchange;

recording indices defining the identities of the transferred trunk circuits;

intercepting messages addressed to the selected exchange;

comparing trunk circuit identifying indices of the intercepted messages with the recorded trunk circuit identity defining indices; and transmitting to the new exchange intercepted messages identifying trunk circuits transferred to the new exchange.

17. The method in accordance with claim 16 wherein the new exchange is connected to the signaling network, further comprising the steps of assigning a temporary address to the new exchange and assigning the address of the selected exchange upon the transfer of all trunk circuits from the selected exchange to the new exchange.

18. The method in accordance with claim 17 wherein the messages comprise destination address indices and the step of transmitting comprises the step of modifying intercepted messages by inserting in the intercepted messages address indicia identifying the new exchange as the destination.

19. The method in accordance with claim 18 wherein the messages further comprise origination address indices identifying an originating exchange and the method further comprises the steps of:

transmitting to the selected exchange messages from the new exchange and destined for another exchange in the telecommunication system, the messages comprising originating address indicia identifying the new exchange and additional data identifying the other exchange; intercepting a message transmitted by the new exchange;

modifying the intercepted message by substituting the address identity of the selected exchange as the origination address indices of the message and substituting data defining the other exchange as the destination address indices in the message; and transmitting the message via the signaling network.

20. In a telecommunication system comprising a plurality of cooperating telecommunication exchanges and a signaling network interconnecting the exchanges for the transfer of interexchange signaling messages defining functions to be performed in a receiving exchange with respect to interexchange trunk circuits and subscriber line circuits defined in the messages, the method of substituting a new exchange for a selected one of the plurality of cooperating exchanges, wherein the selected exchange comprises a plurality of trunk circuits and a plurality of subscriber line circuits, the method comprising the steps of:

transferring a subset of the plurality of trunk circuits and a subset of the plurality of subscriber line circuits from the selected exchange to the new exchange;

recording indices defining the identities of transferred subscriber line circuits and transferred trunk circuits;

intercepting messages addressed to the selected exchange;

comparing trunk circuit and line circuit identifying indices of the intercepted messages with the recorded line circuit and trunk circuit identity defining indices; and transmitting to the new exchange messages identifying trunk circuits and line circuits transferred to the new exchange.

21. The method in accordance with claim 20 and further comprising the step of transmitting to the selected exchange messages identifying subscriber line circuits and trunk circuits not transferred to the new exchange.

22. The method in accordance with claim 21 and further comprising the step of transmitting to the new exchange messages identifying trunk circuits transferred to the new exchange and subscriber line circuits remaining on the old exchange.

23. The method in accordance with claim 22 and further comprising the step of transmitting to the selected exchange messages identifying subscriber line circuits transferred to the new exchange and trunk circuits remaining on the selected exchange.

24. In a telecommunication system comprising a plurality of cooperating exchanges and a signaling network interconnecting the exchange for the transfer of interexchange signaling messages defining functions to be performed in a receiving exchange with respect to interexchange trunks defined in the messages, the method of handling in a first exchange messages pertaining to trunks connected to a second exchange, comprising the steps of:

recording in the first exchange indices defining the identity of trunks connected to the second exchange;

receiving in the first exchange messages addressed to the first exchange;

determining from trunk identifying indices in intercepted messages and the recorded indices whether an intercepted message pertains to a trunk connected to the second exchange; and controlling the transfer to the second exchange of messages identifying trunks transferred to the second exchange.

25. In a system comprising a plurality of cooperating nodes interconnected by a message transfer network, wherein the nodes communicate via messages including destination address information and indicia identifying functions to be executed, the method of substituting a new node for a selected node of the network on a real time basis, comprising the steps of:

recording indicia defining functions of the selected node assigned for execution by the new node;

intercepting a message from another node of the network addressed to the selected node; and selectively applying the intercepted message to the new node when the function defined in a message is a function assigned to the new node.

* * * * *

UNITED STATES PATENT AND TRADEMARK OFFICE
CERTIFICATE OF CORRECTION

PATENT NO.   : 5,048,081
DATED        : September 10, 1991
INVENTOR(S)  : George W. Gavaras, Albert S. Loots, Praful B. Shanghavi It is certified that error appears in the above-identified patent and that said Letters Patent is hereby corrected as shown below:

Column 16, claim 4, line 10, before "second" insert --said--.
Column 17, claim 9, line 9, before "second" insert --said--.
Column 17, claim 9, line 22, before "second" insert --said--.
Column 20, claim 24, line 10, delete "exchange" and substitute --exchanges--.
Column 20, claim 25, line 42, before "message" delete "a" and substitute --the--.

Signed and Sealed this

Fifth Day of January, 1993

Attest:

DOUGLAS B. COMER

*Attesting Officer*    Acting Commissioner of Patents and Trademarks